Oct. 1, 1946.  A. KALITINSKY  2,408,427
CYLINDER CONSTRUCTION
Filed May 11, 1943  3 Sheets-Sheet 1

INVENTOR
Andrew Kalitinsky
Charles A. Warren
ATTORNEY

Oct. 1, 1946.                    A. KALITINSKY                      2,408,427
                              CYLINDER CONSTRUCTION
                          Filed May 11, 1943           3 Sheets-Sheet 2

INVENTOR
Andrew Kalitinsky
Charles A. Warren
ATTORNEY

Oct. 1, 1946.  A. KALITINSKY  2,408,427
CYLINDER CONSTRUCTION
Filed May 11, 1943   3 Sheets-Sheet 3

INVENTOR
Andrew Kalitinsky
Charles Warren
ATTORNEY

Patented Oct. 1, 1946

2,408,427

UNITED STATES PATENT OFFICE 2,408,427

CYLINDER CONSTRUCTION

Andrew Kalitinsky, Eagleville, Conn., assignor to United Aircraft Corporation, East Hartford, Conn., a corporation of Delaware Application May 11, 1943, Serial No. 486,615

13 Claims. (Cl. 309—2)

1

The present invention relates to the assembly of a cylinder construction and particularly to the assembly of the compressor of a free-piston engine-and-compressor unit.

The assembly of a cylinder wall and the cylinder heads where weight is not of prime importance is easily accomplished by use of bolts which hold the cylinder heads in place. If the cylinder wall is thick enough to receive the bolts, it is frequently considerably heavier than necessary for the pressures to which the cylinder is subjected. If the cylinder wall has flanges to which the head is attached, the wall is subjected to a bending moment since the bolts are not in line with the cylinder wall. An object of this invention is to overcome these difficulties by having the connecting means between the cylinder and heads an integral part of these elements.

The opposite cylinder heads, particularly in compressors, may have projecting interengaging parts (such as manifolds integral with the heads), so that turning of the heads relative to each other during assembly is impossible. A feature of this invention is the assembly of a cylinder construction by interengaging threads on the cylinder and the heads for assembly by rotation of the cylinder with respect to the heads.

Another feature of the invention is the assembly of a free-piston compressor, the opposed heads of which have integral interengaging manifolds.

Other objects and advantages will be apparent from the specification and claims, and from the accompanying drawings which illustrate what is now considered to be a preferred embodiment of the invention.

Figure 1:
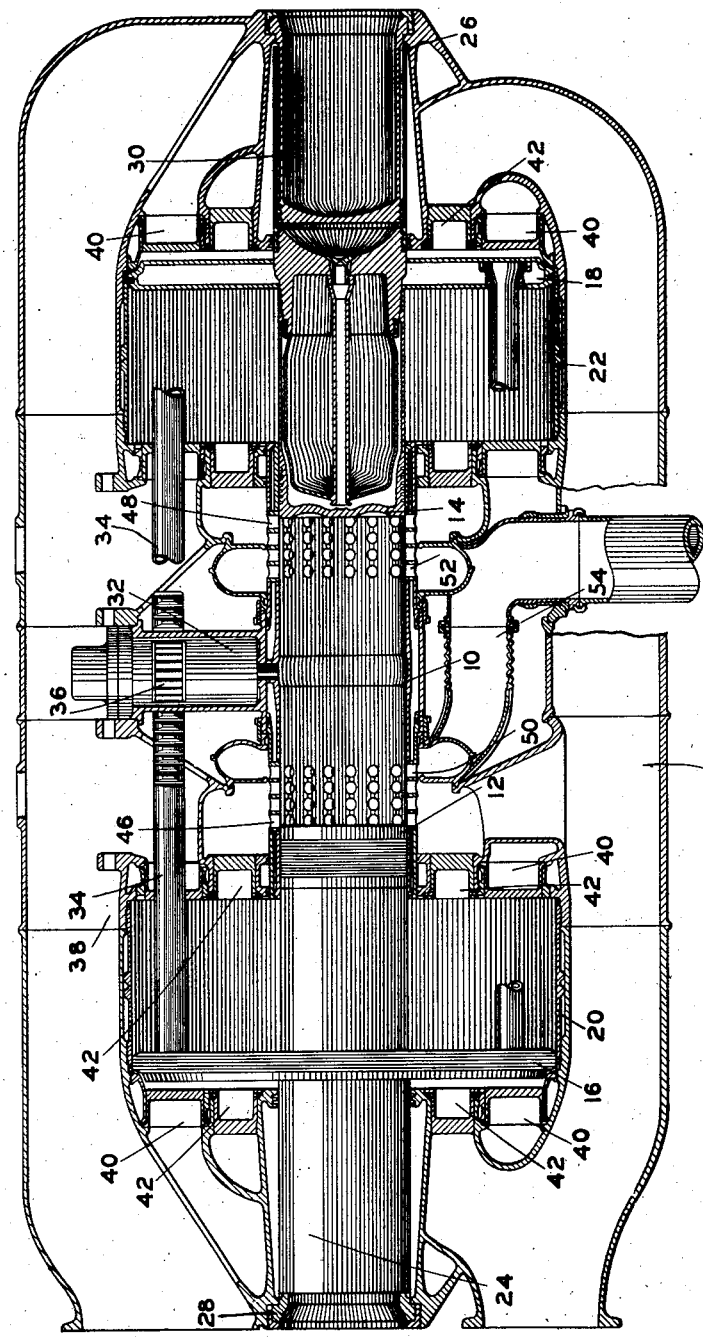
Fig. 1 is a sectional view through a free-piston engine-and-compressor unit.
Figure 2:
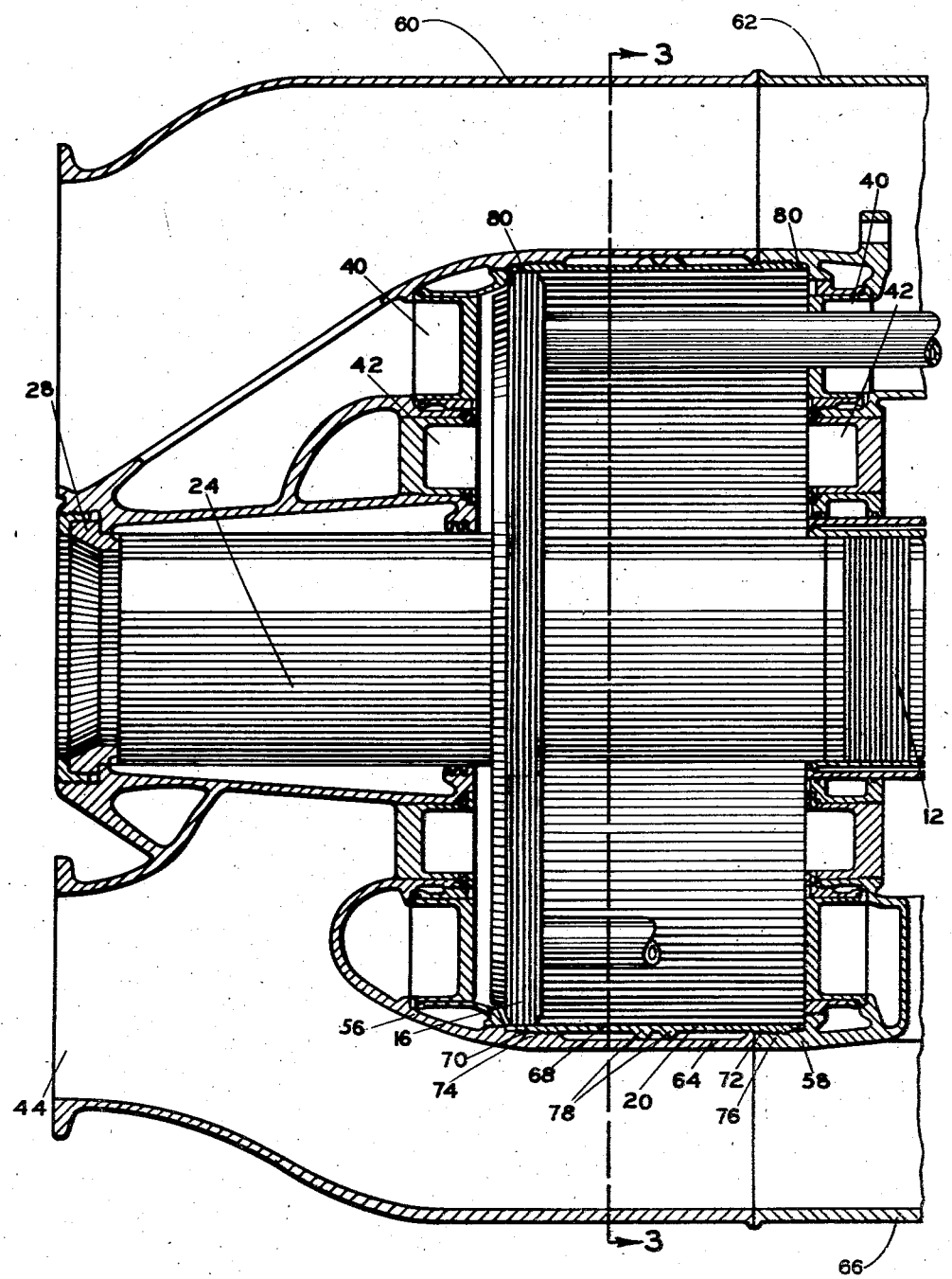
Fig. 2 is a fragmentary sectional view on a larger scale showing the interengaging threads on the compressor cylinder.
Figure 3:
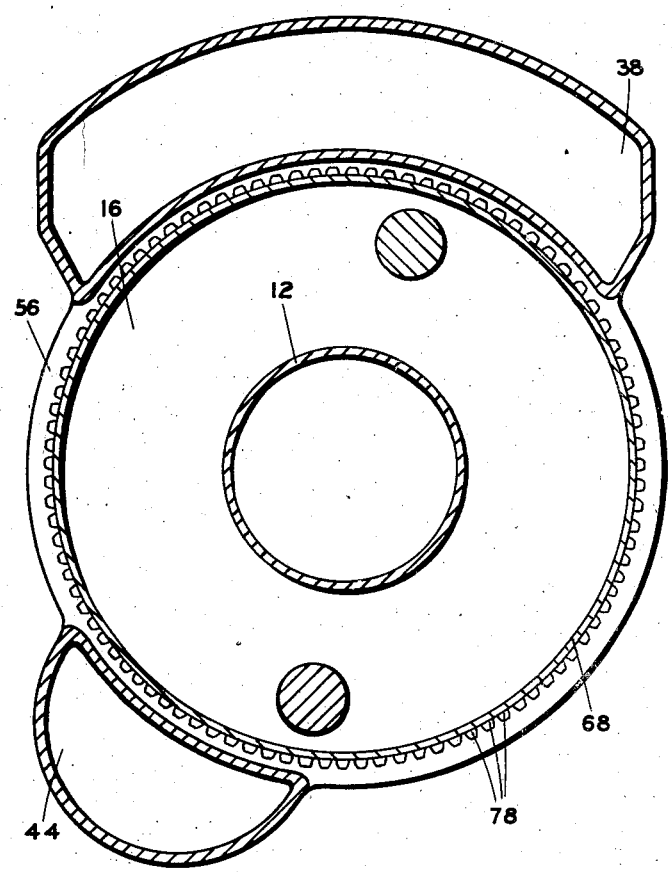
Fig. 3 is a sectional view on the line 3—3 of Fig. 2.

The unit shown includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves in combination with stationary pistons 28 and 30 form air spring cylinders.

The piston assemblies are moved apart by the burning of fuel injected into engine cylinder 10 by one or more devices 32. Air compressed in the air spring cylinders on the power stroke returns the piston assemblies. The assemblies are maintained at equal distances from the center of the engine cylinder by a linkage which may include racks 34 on the compressor pistons meshing with a pinion 36.

Intake manifold 38 conducts air to intake valves 40 through which air alternately enters opposite ends of the compressor cylinders. The compressed air leaves the cylinder through discharge valves 42, also at opposite ends of the compressor cylinders, and passes through scavenge manifold 44 through spaced ports 46 and 48 which are uncovered by pistons 12 and 14 at the end of the power stroke thereby permitting air to be blown through the engine cylinder and exhaust ports 50 and 52 into exhaust manifold 54.

The compressor cylinders are of similar construction and only the assembly of cylinder 20 need be described. This cylinder has inner and outer heads 56 and 58 in which are positioned both inlet and discharge valves 40 and 42. Sections 60 and 62 of intake manifold 38 and sections 64 and 66 of scavenge manifold 44 are integral with heads 56 and 58 respectively, and these sections abut each other as the heads are assembled on the sleeve 68 which forms the wall of the compressor cylinder. Assembly of heads 56 and 58 is accomplished by providing right and left threads 70 and 72 near the opposite ends of sleeve 68. Cooperating threads 74 and 76 are provided on heads 56 and 58 respectively. Although the heads are not turnable with respect to each other, because of the interengaging manifold sections, these heads are brought into proper relation to each other simultaneously by turning the sleeve 68. Spaced projecting teeth 78 are provided on the outer surface of the sleeve for turning it.

Threaded sleeve or cylinder 68 and the cooperating threads on cylinder heads 56 and 58 constitute a form of turnbuckle by which the heads and cylinder may be assembled and held in exact relation to each other. Sealing rings 80 may be placed between the compressor sleeve and the heads to form a tight joint.

It is to be understood that the invention is not limited to the specific embodiment herein illustrated and described, but may be used in other ways without departure from its spirit as defined by the following claims.

I claim:

1. A cylinder assembly comprising a cylinder, opposed heads and means integral with said cylinder and heads for holding said parts in assembled relation, said means including interengaging right and left hand threads on said cylinder and heads.

2. In a free-piston engine-and-compressor unit, a compressor assembly including a cylinder, opposed heads at opposite ends of the cylinder, and means integral with said cylinder and heads for holding the parts in assembled relation, said means including right and left hand threads at the ends of the cylinder and cooperating threads on the heads.

3. A cylinder assembly including opposed cylinder heads and turnbuckle means interconnecting said heads for holding said heads in predetermined spaced relationship.

4. In a cylinder assembly, opposed cylinder heads, a cylinder extending between said heads and turnbuckle means integral with the cylinder and heads for holding the heads in assembled relation.

5. In a cylinder assembly, opposed cylinder heads, a cylinder extending between said heads, turnbuckle means integral with the cylinder and heads for holding the heads in assembled relation, and a row of teeth on the cylinder for turning it.

6. In a cylinder assembly, opposed cylinder heads having interengaging elements thereon, and turnbuckle means extending between and interconnecting the heads and adapted by rotation with respect to the heads for urging the heads into predetermined spaced relation.

7. In a cylinder assembly, opposed cylinder heads having interengaging elements thereon, and turnbuckle means extending between and connecting the heads and adapted by rotation with respect to the heads for urging the heads into predetermined spaced relation, said turnbuckle means comprising a cylinder extending between and engaging said heads.

8. In a free-piston engine-and-compressor unit, a cylinder having right and left hand threads at the ends, and opposed heads for said cylinder having cooperating threads engaging the threads at the ends of the cylinder.

9. In a free-piston engine-and-compressor unit, a cylinder having right and left hand threads at the ends, opposed heads for said cylinder having cooperating threads engaging the threads at the ends of the cylinder, said cylinder constituting a turnbuckle by which the heads are moved toward each other into predetermined relation.

10. In the assembly of a cylinder construction, including a cylinder having right and left hand threads at its ends and cylinder heads having cooperating threads, the step of turning the cylinder with respect to the heads with the cooperating threads on the cylinder and heads in interengagement.

11. In the assembly of a cylinder construction, including a cylinder having right and left hand threads at its ends and cylinder heads having cooperating threads, the step of turning the cylinder with respect to the heads by teeth on the cylinder, with cooperating threads on the cylinder and heads in interengagement.

12. In the assembly of a cylinder construction, cylinder having right and left hand threads at its ends and cylinder heads having cooperating threads and also interengaging elements preventing relative rotation, and turning the cylinder with respect to the heads with the cooperating threads on the cylinder and heads in interengagement.

13. In a free-piston engine-and-compressor unit, a compressor including a cylinder, having right and left hand threads at the ends, and a cylinder head for each of said ends, said heads having integral manifolds adapted for interengagement, said heads having threads engagable with the threads on the cylinder, said engaging threads constituting the sole connection between said heads and the cylinder.

ANDREW KALITINSKY.